US008446489B2

(12) United States Patent
Kaneo et al.

(10) Patent No.: US 8,446,489 B2
(45) Date of Patent: May 21, 2013

(54) IMAGING DEVICE, DRIVE CONTROL METHOD, AND PROGRAM

(75) Inventors: Yasuhiro Kaneo, Fukuoka (JP); Shizunori Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/496,016

(22) PCT Filed: Sep. 14, 2010

(86) PCT No.: PCT/JP2010/065861
§ 371 (c)(1),
(2), (4) Date: Mar. 14, 2012

(87) PCT Pub. No.: WO2011/037048
PCT Pub. Date: Mar. 31, 2011

(65) Prior Publication Data
US 2012/0169908 A1 Jul. 5, 2012

(30) Foreign Application Priority Data
Sep. 24, 2009 (JP) .................................. 2009-219626

(51) Int. Cl.
H04N 5/235 (2006.01)
H04N 3/14 (2006.01)
H04N 5/335 (2011.01)
H04N 5/20 (2006.01)

(52) U.S. Cl.
USPC ........ 348/229.1; 348/273; 348/364; 348/255; 348/296

(58) Field of Classification Search
USPC ............... 348/229.1, 255, 273, 296
See application file for complete search history.

(56) References Cited

U.S. PATENT DOCUMENTS 7,190,403 B2 * 3/2007 Yamashita et al. ............ 348/364
8,089,530 B2 * 1/2012 Mabuchi ..................... 348/229.1
(Continued)

FOREIGN PATENT DOCUMENTS

JP 2003-163937 6/2003
JP 2006-253876 A 9/2006
(Continued)

OTHER PUBLICATIONS

International Search Report; International Application No. PCT/JP2010/065861; International Filing Date: Sep. 14, 2012; Completion of the International Search: Nov. 29, 2010.

*Primary Examiner* — Tuan Ho
*Assistant Examiner* — Shahbaz Nazrul
(74) *Attorney, Agent, or Firm* — Rader, Fishman & Grauer PLLC

(57) ABSTRACT

The present invention relates to an imaging device, a drive control method, and a program configured to be capable of making sensitivity ratios constant and improving a S/N ratio. When a storage period of pixels (G pixels) with a green filter as a reference does not exceed a predetermined threshold value, an adjustment of the sensitivity ratio by gains by color is performed. When the storage period of the pixels with a green filter is larger than the predetermined threshold value, the storage periods of the pixels with a red filter (R pixels) and the pixels with a blue filter (B pixels) are calculated from the set sensitivity ratios, and if the calculated values do not exceed a maximum setting value, the adjustment of the sensitivity ratios by the storage periods by color is performed. In contrast, if the calculated storage period is larger than the maximum setting value, the adjustment of the sensitivity ratio is performed by combining the storage period by color and the gains by color. The present invention can be applied to cameras having a solid imaging device.

5 Claims, 9 Drawing Sheets

U.S. PATENT DOCUMENTS

| | | | |
|---|---|---|---|
| 2003/0098917 A1* | 5/2003 | Oda | 348/272 |
| 2008/0165264 A1* | 7/2008 | Saito et al. | 348/296 |
| 2008/0218598 A1* | 9/2008 | Harada et al. | 348/222.1 |
| 2011/0228149 A1* | 9/2011 | Naruse et al. | 348/273 |

FOREIGN PATENT DOCUMENTS

| | | |
|---|---|---|
| JP | 2007-082023 | 3/2007 |
| JP | 2007-288490 | 11/2007 |

* cited by examiner

IMAGING DEVICE, DRIVE CONTROL METHOD, AND PROGRAM

TECHNICAL FIELD

The present invention relates to an imaging device, a drive control method, and a program and, more specifically, to an imaging device, a drive control method, and a program which are configured to improve an S/N ratio by using up saturating signals of respective pixels having different sensitivities.

BACKGROUND ART

An imaging device (image sensor) used in image pickup apparatuses such as digital still cameras and digital video cameras has a configuration having a color filter array of red, green, and blue, for example. In the image sensor, a correcting process is performed by outputting image data in block on the basis of the same storage period from all the pixels without controlling the storage period of each color, and then calculating sensitivity ratios (white balance, and so on) of respective colors in a processor on the downstream side.

In this case, since the storage period needs to be determined in conformity to pixels having high sensitivity, for example, green pixels, pixels of colors having low sensitivity, for example red or blue pixels might not be capable of using up saturating signals. Although there is a case where gain is applied (signal amplification) to an output signal from pixels having low sensitivity to correct the difference in sensitivity, if the gain is applied, the noise might be amplified together with the signal. Also, a method of varying the storage period by color is also proposed (For example, see Patent Documents 1 and 2).

CITED REFERENCE

Patent Document

Patent Document 1: JP-A-2006-253876
Patent Document 2: JP-A-2008-507908

SUMMARY OF INVENTION

Problems to be Solved by the Invention

However, when varying the storage periods by color, the storage periods by color can be changed while maintaining the sensitivity ratios constant in a scene of a high illuminance, while the sensitivity ratios may not be maintained to be constant only by the storage periods by color in a scene of a medium illuminance or a scene of a low illuminance. From these reasons, it is desired to use up the saturating signals of respective pixels having different sensitivities and keep the sensitivity ratios constant irrespective of colors to improve the S/N ratio.

In view of such circumstances, the present invention is intended to achieve an improvement of a S/N ratio by using up the saturating signals of respective pixels having different sensitivities.

Means for Solving the Problems

An imaging device according to an aspect of the present invention including: pixels including a photoelectric conversion element and arrayed two-dimensionally in a matrix pattern and are arrayed in a state of being classified in groups by color on the basis of the color filter array; storage period controlling means configured to control storage periods for storing charges in the pixels by color; gain control means configured to control gains when amplifying signals corresponding to charges stored in the pixels and read out from the pixels; adjusting means configured to adjust the sensitivity ratio of the pixels different from color to color by setting the storage periods by color in the storage period control means, and setting the gains by color in the gain control means, wherein the adjusting means includes: acquiring means configured to acquire a storage period set to the pixels having a best sensitivity ratio and the sensitivity ratios by colors; calculating means configured to calculate the storage periods of the pixels by color from the storage period and the sensitivity ratios acquired by the acquiring means; first setting means configured, when all the storage periods calculated by the calculating means do not exceed the maximum setting value, to set the calculated storage periods to the storage period control means; and second setting means configured, when there is a color whose storage period exceeds the maximum setting value of the storage period from among the storage periods calculated by the calculating means, to set the storage period at the maximum setting value to the storage period control means for the signal of the corresponding color, and calculate a gain by which the signal of the corresponding color is multiplied and set the gain to the gain control means in order to compensate for the lack of the storage period.

The adjusting means further includes: determining means configured to determine whether or not the storage period acquired by the acquiring means does not exceed a predetermined threshold value; and third setting means configured, when the storage period of the pixels is determined not to exceed the predetermined threshold value, to calculate a gain by which the respective signals are multiplied on the basis of the sensitivity ratio acquired by the acquiring means by color and set the gain to the gain control means.

The predetermined threshold value may be a value for determining that the error in the adjustment of the sensitivity ratio is smaller when adjusting the sensitivity ratio of the pixels by color by adjusting the gain than when adjusting the same by the storage period.

A drive control method according to an aspect of the present invention is a drive control method for an imaging device including: pixels including a photoelectric conversion element, arrayed two-dimensionally in a matrix pattern and arrayed in a state of being classified in groups by color on the basis of the color filter array; storage period controlling means configured to control storage periods for storing charges in the pixels by color; gain control means configured to control gains when amplifying signals corresponding to charges stored in the pixels and read out from the pixels; adjusting means configured to adjust the sensitivity ratio of the pixels different from color to color by setting the storage periods by color in the storage period control means, and setting the gains by color in the gain control means, wherein the adjusting means includes steps of: acquiring a storage period set to the pixels having a best sensitivity ratio and the sensitivity ratios by colors; calculating the storage periods of the pixels by color from the acquired storage period and the sensitivity ratios; when all the storage periods calculated by the calculating means do not exceed the maximum setting value, setting the calculated storage periods to the storage period controlling means; and when there is a color whose storage period exceeds the maximum setting value of the storage period from among the calculated storage periods, setting the storage period at the maximum setting value to the storage period control means for the signal of the corresponding color, and calculating a gain by which the signal of the corresponding color is multiplied and set the gain to the gain control means in order to compensate for the lack of the storage period.

A program according to an aspect of the present invention is a program to cause a computer configured to control adjusting means of an imaging device including: pixels including a photoelectric conversion element, arrayed two-dimensionally in a matrix pattern and arrayed in a state of being classified in groups by color on the basis of the color filter array; storage period controlling means configured to control storage periods for storing charges in the pixels by color; gain control means configured to control gains when amplifying signals corresponding to charges stored in the pixels and read out from the pixels; and adjusting means configured to adjust the sensitivity ratio of the pixels different from color to color by setting the storage periods by color in the storage period control means, and setting the gains by color in the gain control means, the computer executes a process including: acquiring a storage period set to the pixels having a best sensitivity ratio and the sensitivity ratios by colors; calculating the storage periods of the pixels by color from the acquired storage period and the sensitivity ratios; when calculated all the storage periods do not exceed the maximum setting value, setting the calculated storage periods to the storage period setting means; and when there is a color whose storage period exceeds the maximum setting value of the storage period from among the calculated storage periods, setting the storage period at the maximum setting value to the storage period control means for the signal of the corresponding color, calculating a gain by which the signal of the corresponding color is multiplied and setting the gain to the gain control means in order to compensate for the lack of the storage period.

In an aspect of the present invention, the storage periods for storing charges in the pixels are controlled by colors, the gains generated when amplifying the signals corresponding to the charges stored in the pixels and read from the pixels are controlled, and the storage periods and the gains used in the control are set by color. The storage periods of the pixels are calculated by color form the storage period set for the pixels having a best sensitivity ratio and the sensitivity ratio by color, and when all the calculated storage period do not exceed the maximum set time, the calculated storage periods are set as the storage periods, and when there is a color whose calculated storage period exceeds the maximum setting value of the storage period from among the calculated storage period, the storage period at the maximum setting value is set as the storage period for the signal of the corresponding color, and the gain by which the color signal is multiplied is calculated and set in order to compensate for the lack of the storage period.

Advantages of the Invention

According to an aspect of the present invention, the saturating signals can be used up in individual pixels having different sensitivities. Also, the S/N ratio can be improved.

BEST MODES FOR CARRYING OUT THE INVENTION

Figure 1:
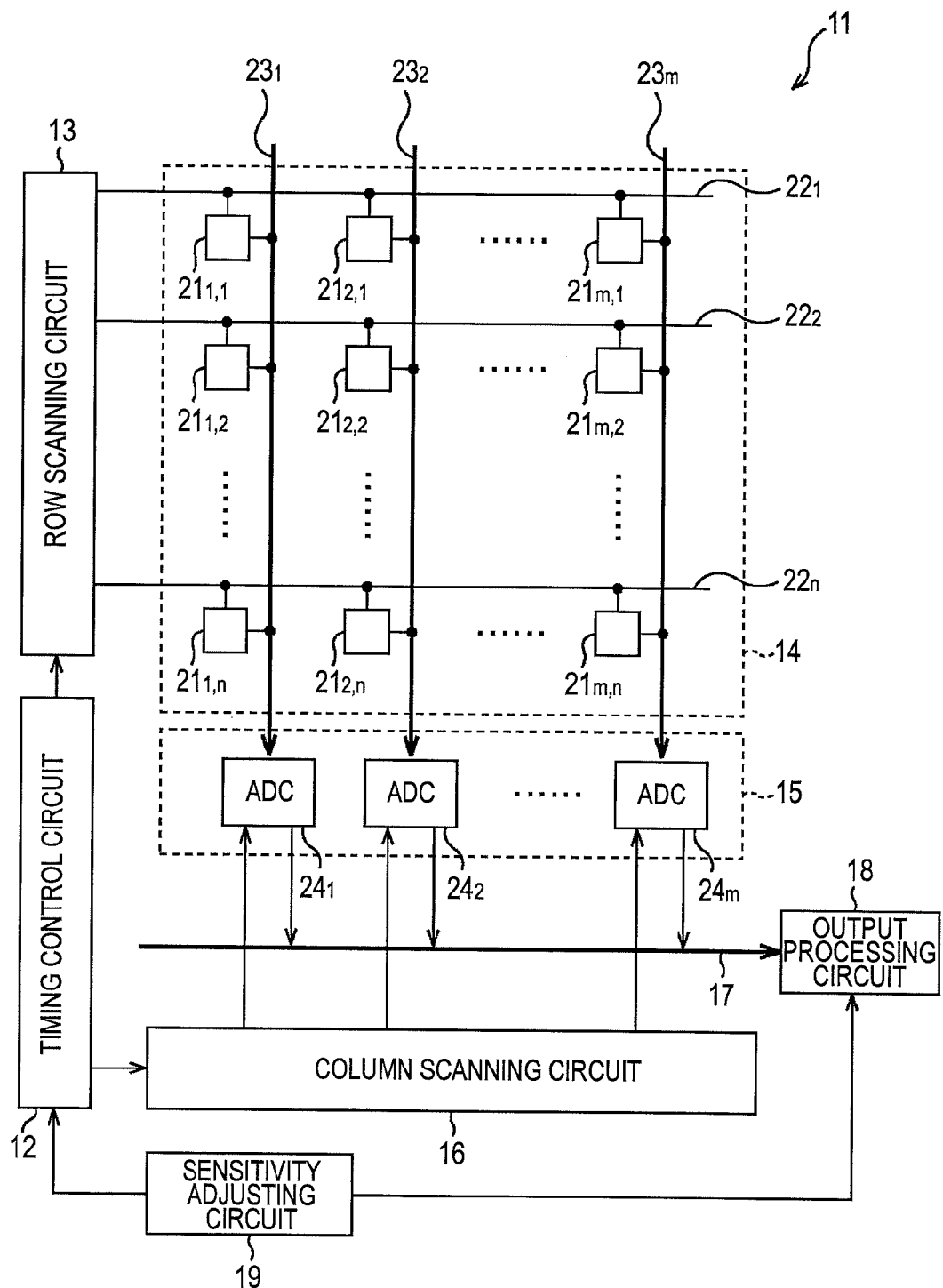
FIG. 1 is a drawing showing a configuration of a CMOS image sensor to which the present invention is applied according to an embodiment.

Referring now to the drawings, embodiment of the present invention will be described. The present invention can be applied to an imaging device (image sensor) used in image pickup apparatuses such as digital still cameras and digital video cameras. In the following description, a CMOS (Complementary Metal Oxide Semiconductor) image sensor is exemplified for description as an image sensor, it does not mean that the present invention is only applicable to the CMOS image sensor.

[Block Diagram of CMOS Image Sensor]

FIG. 1 is a drawing showing an example of a configuration of a CMOS image sensor (solid state imaging device) to which the present invention is applied according to one embodiment. The CMOS image sensor 11 shown in FIG. 1 includes a timing control circuit 12, a row scanning circuit 13, a pixel array portion 14, a column signal processing circuit 15, a column scanning circuit 16, a horizontal output line 17, an output processing circuit 18, and a sensitivity adjusting circuit 19.

The timing control circuit 12 supplies a clock signal or a timing signal required for a predetermined operation to the row scanning circuit 13 and the column scanning circuit 16 on the basis of a master clock having a predetermined frequency. For example, the timing control circuit 12 supplies the timing signal which controls a shutter operation and a reading-out operation of pixels to the row scanning circuit 13 and the column scanning circuit 16.

The row (vertical) scanning circuit 13 supplies a signal which controls the output of pixel signals at predetermined timings in sequence to the pixels arranged in the vertical direction in the pixel array portion 14. The pixel array portion 14 includes pixels $21_{1.1}$ to $21_{m.n}$ which are pixels 21 arranged in a matrix of n rows×m columns, n horizontal signal lines $22_1$ to $22_n$, and m vertical signal lines $23_1$ to $23_m$.

In the following description, when the pixels $21_{1.1}$ to $21_{m.n}$ do not have to be distinctively expressed, the pixels are simply expressed as the pixels 21. Other portions are expressed in the same manner.

The pixels $21_{1.1}$ to $21_{m.n}$ output the pixel signals according to a charge stored in a photoelectric conversion element respectively to the vertical signal lines $23_1$ to $23_m$ according to the signals supplied from the row scanning circuit 13 via the horizontal signal lines $22_1$ to $22_n$, respectively. The horizontal signal lines $22_1$ to $22_n$ connect the pixels 21 in the horizontal direction from the pixel $21_{1.1}$ to $24_{m.n}$, and the row scanning circuit 13, respectively. In other words, the pixels $21_{1.1}$ to $21_{m.1}$ are connected to the horizontal signal line $22_1$, the pixels $21_{1.2}$ to $21_{m.n}$ are connected to the horizontal signal line $22_2$, and in the same manner from then onward, the pixels $21_{1.n}$ to $21_{m.n}$ are connected to the horizontal signal line $22_n$.

The vertical signal lines $23_1$ to $23_m$ connect the pixels 21 in the vertical direction from pixel $21_{1.1}$ to $21_{m.n}$ and the column signal processing circuit 15, respectively. In other words, the pixels $21_{1.1}$ to $21_{1.n}$ are connected to the vertical signal line $23_1$, the pixels $21_{2.1}$ to $21_{2.n}$ are connected to the vertical signal line $23_2$, and in the same manner from then onward, the pixels $21_{m.1}$ to $21_{m.n}$ are connected to the vertical signal line $23_m$.

Therefore, the pixels $21_{1.1}$ to $21_{1.n}$ output the pixel signals according to the charge stored in the photoelectric conversion element to the vertical signal line $23_1$. The pixels $21_{2.1}$ to $21_{2.n}$ output the pixel signals according to the charge stored in the photoelectric conversion element to the vertical signal line $23_2$. In the same manner from then onward, the pixels $21_{m.1}$ to $21_{m.n}$ output the pixel signals according to the charge stored in the photoelectric conversion element to the vertical signal line $23_m$.

The column signal processing circuit 15 includes m pieces of ADCs (Analog-Digital Converters) $24_1$ to $24_m$ arranged in parallel. The vertical signal lines $23_1$ to $23_m$ are connected respectively to the ADC $24_1$ to $24_m$. The ADCs $24_1$ to $24_m$ performs a CDS (Correlated Double Sampling) process and an A/D conversion process on the pixel signals supplied from the pixels $21_{1.1}$ to $21_{m.n}$ via the vertical signal lines $23_1$ to $23_m$.

In other words, the vertical signal line $23_1$ is connected to the ACD $24_1$, and the ADC $24_1$ performs a CDS process and the A/D conversion process on the pixel signal supplied from the pixel $21_{1.1}$ to $21_{1.n}$ via the vertical signal line $23_1$. The vertical signal line $23_2$ is connected to the ACD $24_2$, and the ADC $24_2$ performs the CDS process and the A/D conversion process on the pixel signals supplied from the pixels $21_{2.1}$ to $21_{2.n}$ via the vertical signal line $23_2$. In the same manner from then onward, the ADC $24_m$ performs the CDS process and the A/D conversion process on the pixel signals supplied from the pixels $21_{m.1}$ to $21_{m.n}$ via the vertical signal line $23_m$. For reference sake, although the configuration in which the ADC 24 is included in the column signal processing circuit 15 has been described here, a configuration in which the ADC 24 is not included is also possible.

The ADCs $24_1$ to $24_m$ respectively store pixel data after the A/D conversion temporarily and output the same to the horizontal output line 17 according to the control of the column scanning circuit 16. The column (horizontal) scanning circuit 16 causes the pixel data stored in the ADCs $24_1$ to 24m to be output to the horizontal output line 17 in sequence at predetermined timings.

The horizontal output line 17 is connected to the output processing circuit 18, and outputs the pixel data output from the ADCs $24_1$ to $24_m$ to the connected output processing circuit 18. The output processing circuit 18 applies a variety of signal processing on the signals supplied in sequence respectively from the column signal processing circuit 15 through the horizontal output line 17, and outputs the same. As the detailed signal processing in the output processing circuit 18, for example, there is a case where only buffering is performed or, a case where a black level adjustment, correction of column-to-column variations, signal amplification, and color relating process are performed before the buffering.

The sensitivity adjusting circuit 19 adjusts the sensitivity by adjusting the timing of reading in the timing control circuit 12 and the gain in the output processing circuit 18 (adjustment of the gain of the signal amplification) or the like. The process of the sensitivity adjusting circuit 19 will be described later.

The CMOS image sensor 11 configured as described above is a CMOS image sensor referred to as a column AD system in which the ADCs are arranged for each column.

Figure 2:
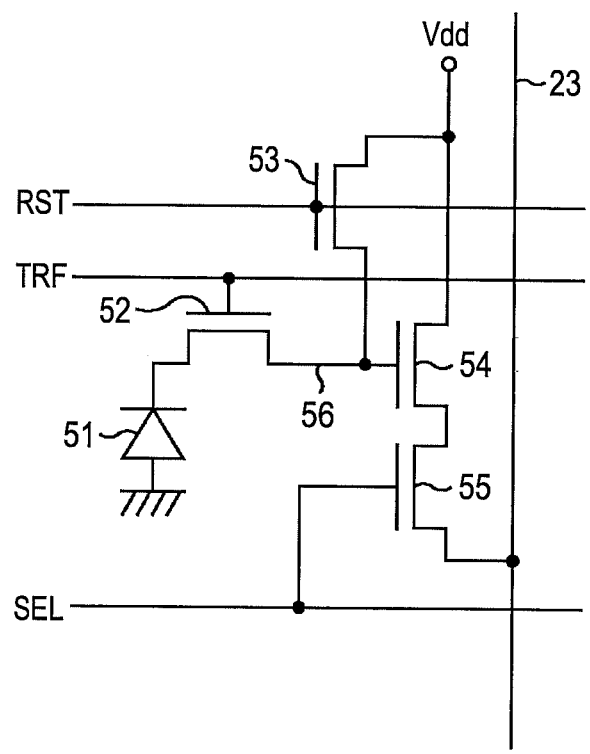
FIG. 2 is an explanatory drawing showing a configuration of a pixel.

The pixels $21_{1.1}$ to $21_{m.n}$ have respectively a configuration as shown in FIG. 2. The pixel 21 shown in FIG. 2 is a pixel circuit having four transistors, for example, a transfer transistor 52, a reset transistor 53, an amplifying transistor 54, and a selecting transistor 55 in addition to the photoelectric conversion element, for example, the photodiode 51.

In FIG. 2, a photodiode 51 performs photoelectric conversion on received light to a light charge (electron, in this case) having an amount of charge according to the amount of light. A cathode of the photodiode 51 is electrically connected to a gate of the amplifying transistor 54 via the transfer transistor 52. Anode electrically connected to the gate of the amplifying transistor 54 is referred to as an FD (floating diffuser) 56.

The transfer transistor 52 is connected to a point between the cathode of the photodiode 51 and the FD 56 and is brought into an ON state by being provided with a transfer pulse TRF, and the light charge after having subjected to the photoelectric conversion is transferred to the FD 56 by the photodiode 51. A drain and a source of the reset transistor 53 are connected to a pixel power source Vdd and the FD 56, respectively, and is brought into an ON state by providing the gate with a reset pulse RST, and resets the FD 56 by disposing the charge of the FD 56 to the pixel power source Vdd prior to the transfer of the signal charge from the photodiode 51 to the FD 56.

The gate and a drain of the amplifying transistor 54 are connected to the FD 56 and the pixel power source Vdd, respectively, and a potential of the FD 56 after having reset by the reset transistor 53 is output as a reset level, and then, the potential of the FD 56 after having transferred the signal charge by the transfer transistor 52 is output as a signal level.

For example, when a drain and a source of the selecting transistor 55 are connected to a source of the amplifying transistor 54 and a vertical signal line 20, respectively, the selecting transistor 55 is brought into the ON state by being provided with a selection pulse SEL, and relays a signal output from the amplifying transistor 54 to the vertical signal line 20 with the pixels 21 in a selected state.

The pixels 21 configured in this manner are connected as described above, so that the CMOS image sensor 11 is configured.

One of color filters of R (red), G (green) and B (blue) is arranged at each of the pixels $21_{1.1}$ to $21_{1.n}$ of the CMOS image sensor 11 in FIG. 1, and each of the pixels 21 receives one of R, G, and B lights.

Figure 3:
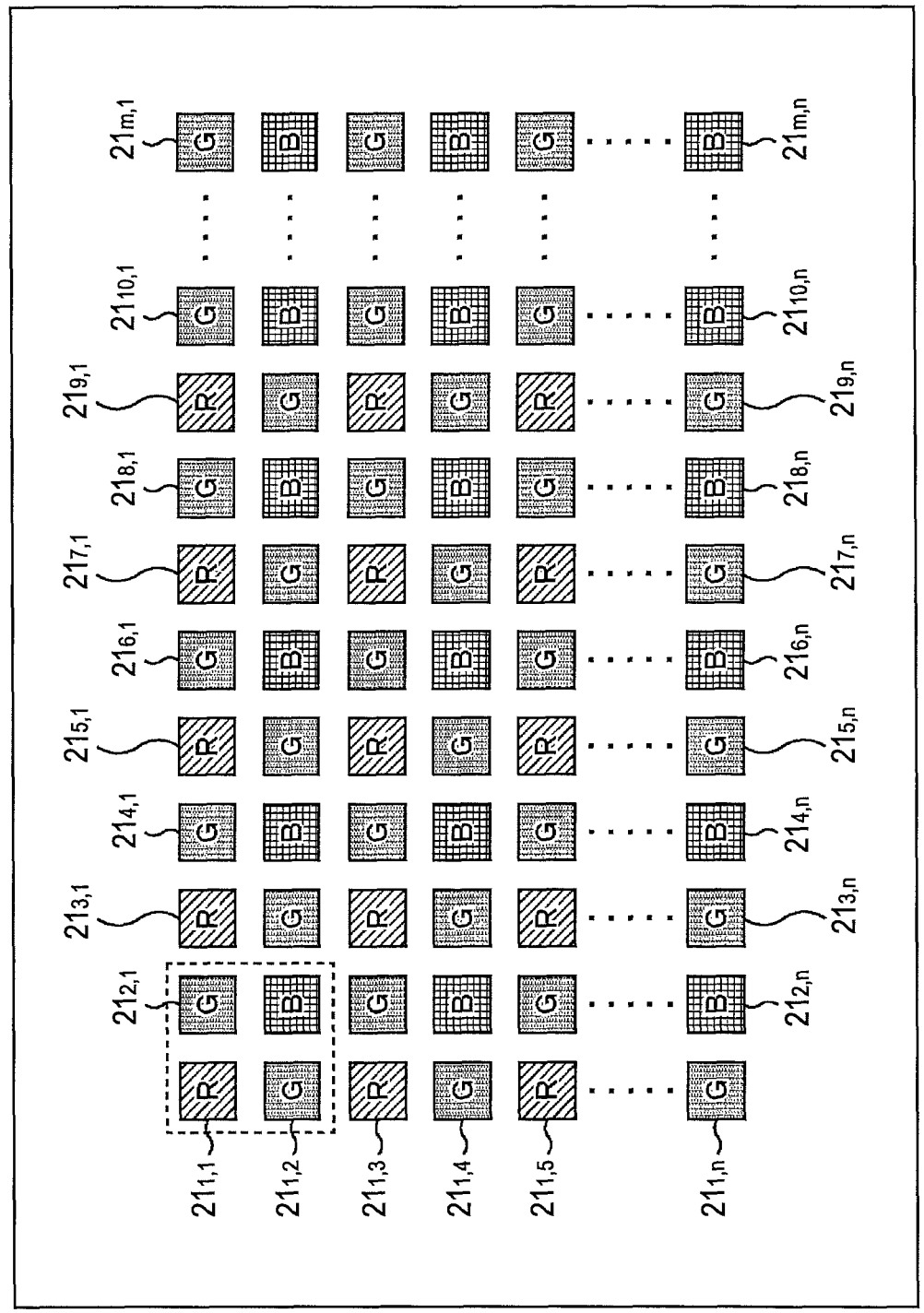
FIG. 3 is a drawing showing an example of array of R, G, and B color filters in the CMOS image sensor.

FIG. 3 shows an example of an array of the R, G, and B color filters in the CMOS image sensor 11. The array of the R, G, and B shown in FIG. 3 are an array referred to as Bayer array. The Bayer array is an array including sets of color arrays one R, two Gs, and one B arranged repeatedly in the row direction and the column direction.

For example, in FIG. 3, the pixel $21_{1.1}$, the pixel $21_{2.1}$, the pixel $21_{1.2}$, and the pixel $21_{2.2}$ constitute a set, and the pixel $21_{1.1}$ is a pixel which receive the R light. Then, the pixel $21_{2.1}$ which is next to the pixel $21_{1.1}$ in the row direction and the pixel $21_{1.2}$ next to the pixel $21_{1.1}$ in the column direction are pixels which receive the G light, and the pixel $21_{2.2}$ is a pixel which receives the B light. Then the same color arrays as the set of the pixel $21_{1.1}$, the pixel $21_{2.1}$, the pixel $21_{1.2}$, and the pixel $21_{2.2}$ are arrayed repeatedly in the row direction and the column direction.

In this manner, the pixels including the photoelectric conversion element are two-dimensionally arrayed in a matrix pattern, and further are arrayed on the basis of the color filters, so that the pixels are arrayed in a state of being grouped by color. In this embodiment, it is assumed that the Bayer array is employed as the color array of the CMOS image sensor 11. However, it is not limited thereto.

Figure 4:
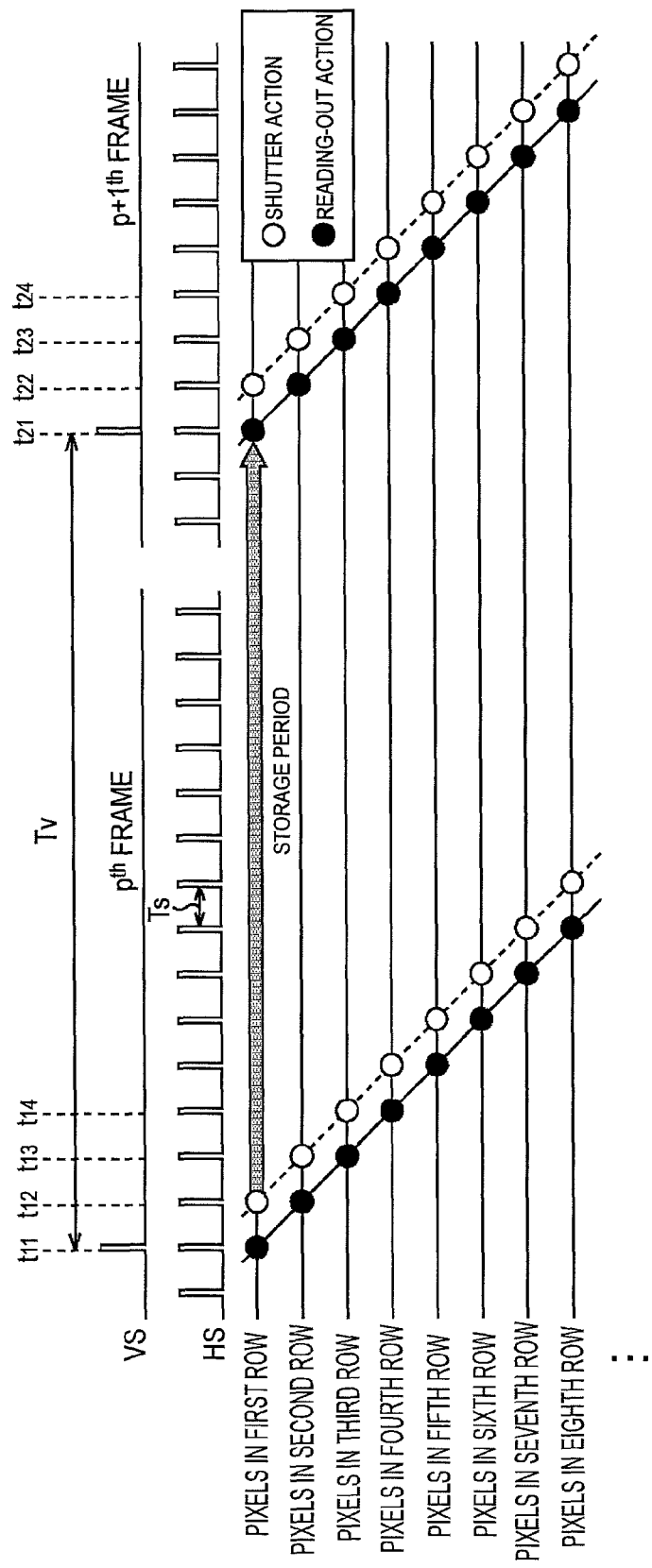
FIG. 4 is an explanatory drawing showing a relationship between pixel reading and storage period.

FIG. 4 is a timing chart of the electronic shutter operation and the reading-out operation. In FIG. 4, a vertical synchronizing signal VS is a signal which rises to a high level (Hi level) for a predetermined time at the beginning of one frame. Therefore, a period from a timing when the vertical synchronizing signal VS rises to the high level once to a timing when reaching the high level for the next time represents time required for processing one frame (hereinafter, referred to as one frame time), and the one frame time is expressed by Tv.

A horizontal synchronizing signal HS is a signal which rises to the high level for a predetermined time at the beginning of each row. Therefore, a period from a timing when the horizontal synchronizing signal VS rises to the high level once to a timing when reaching the high level for the next time corresponds to time required for processing one row (one horizontal time), and the one frame time is expressed by Ts. Considering to secure a storage period to a maximum extent, the reading-out operation may be performed after having performed the shutter operation, immediately before performing the next shutter operation. Therefore, it is assumed that the shutter operation and the reading-out operation are performed once in every row in one frame period, and the maximum storage period is one frame period Tv when the shutter operation and the reading-out operation are recognized to be taken substantially at the same time.

For reference sake, there is also a case where the shutter operation is performed other than the shutter operation which determines the actual storage period for a countermeasure to prevent blooming and the like in practice. The system of the shutter operation is not a global shutter system in which the shutter operation is performed at every pixel at the same time for the pixel array portion 14 having the pixels 21 arrayed two-dimensionally, but a rolling shutter system in which the pixels 21 which perform the shutter operation are shifted on the row-to-row basis with time.

For example, the reading-out operation of the pixels 21 in the first row is performed at a clock time $t_{11}$, which is a beginning of the $p^{th}$ frame (p>0). In other words, the reading-out operation for reading out a charge stored in a previous $p-1^{th}$ frame (for finishing exposure) is performed at the clock time $t_{11}$ for the pixels 21 in the first row. Then, at a clock time $t_{12}$, which is one horizontal time Ts after thereof, the shutter operation for resetting the stored charge (start the exposure) is performed for the pixels 21 in the first row, and the reading-out operation for reading out the charge stored in the $p-1^{th}$ frame is performed for the pixels 21 in the second row.

At a next clock time $t_{13}$, the shutter operation for the pixels 21 in the second row and the reading-out operation for the pixels 21 in the third row are performed. From then onward, the shutter operation for a predetermined row and the reading-out operation for the subsequent row are performed simultaneously while shifting the row by one horizontal time Ts. Then, the shutter operation with respect to the pixels 21 in the $n^{th}$ row, not shown, and the reading-out operation for reading out the charge stored in the previous $p^{th}$ frame for the pixels 21 in the first row are performed at a clock time $t_{21}$ which is the beginning of a $p+1^{th}$ frame. At a next clock time $t_{22}$, the shutter operation for the pixels 21 in the first row and the reading-out operation for the pixels 21 in the second row are performed. From then onward, the shutter operation of the predetermined row and the reading-out operation for the subsequent row are performed simultaneously while shifting the row by one horizontal time Ts.

In the process described above, the storage period of the pixels 21 in which the shutter operation is performed in the $p^{th}$ frame corresponds to the period until the reading-out operation in the $p+1^{th}$ frame is performed. Then, the storage period corresponds to the one frame time Tv as described above, if the period from the reading-out operation to the shutter operation (one horizontal period Ts) is ignored.

In this embodiment, the sensitivity ratio by color is adjusted by adjusting the storage periods. The sensitivity ratio is adjusted also by adjusting the gains with respect to the signals according to the stored charges. The adjustment of the sensitivity ratio will be described below.

[Adjustment of Sensitivity Ratio]

The pixels with a color filter are different in sensitivity with respect to lights by color and, generally, green tends to have high sensitivity, and red and blue tend not to have high sensitivity. When the storage period for storing charge in the pixel is determined so as to conform the pixels having high sensitivity, for example, the green pixels, the pixels of colors having low sensitivity, for example, the red or blue pixels might not be capable of using up saturating signals. When gain is applied (signal amplification) to the output signal from pixels having low sensitivity to correct the difference in sensitivity, if the gain is applied, the noise might be amplified together with the signal. Considering this situation, the sensitivity adjusting circuit 19 adjusts the sensitivity.

In this embodiment, the sensitivity is adjusted by adjusting the storage period by color under the control of the timing control circuit 12. The signal level is adjusted by color by the gain process (a signal amplifying process) in the output processing circuit 18. The ratios of the sensitivity different from color to color are adjusted by the adjustment of the storage periods and the adjustment of the gains.

Figure 5:
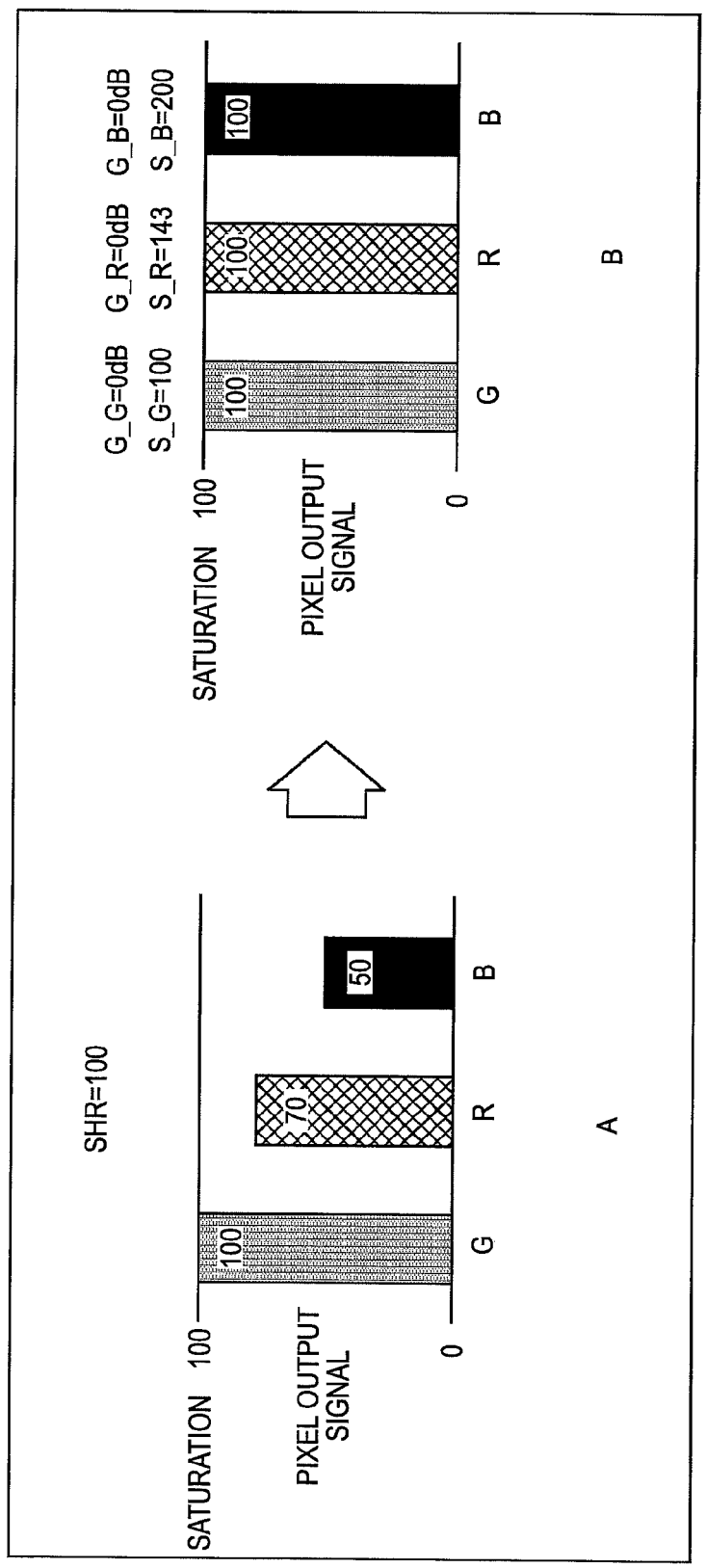
FIG. 5 is an explanatory drawing showing adjustment of sensitivity ratio.
Figure 6:
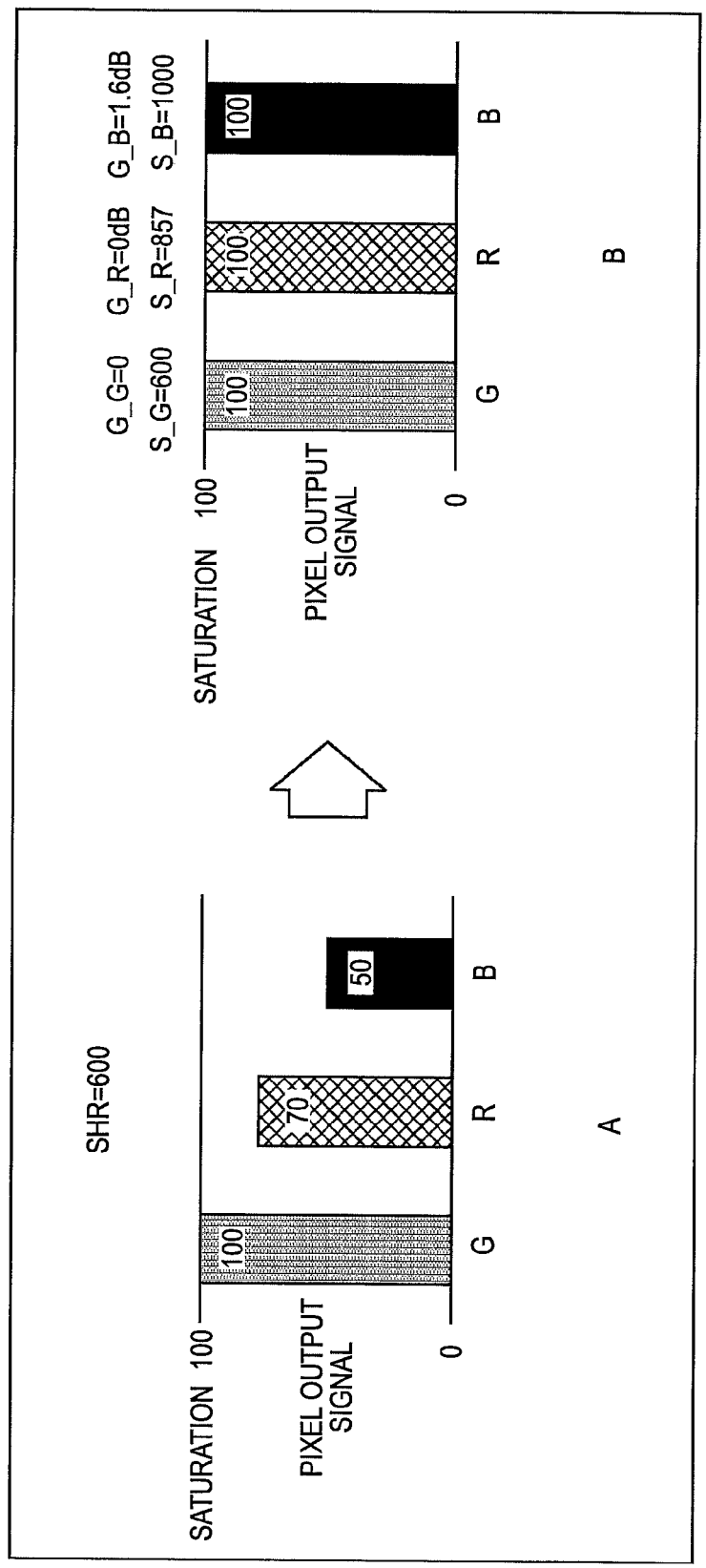
FIG. 6 is an explanatory drawing showing adjustment of the sensitivity ratio.
Figure 7:
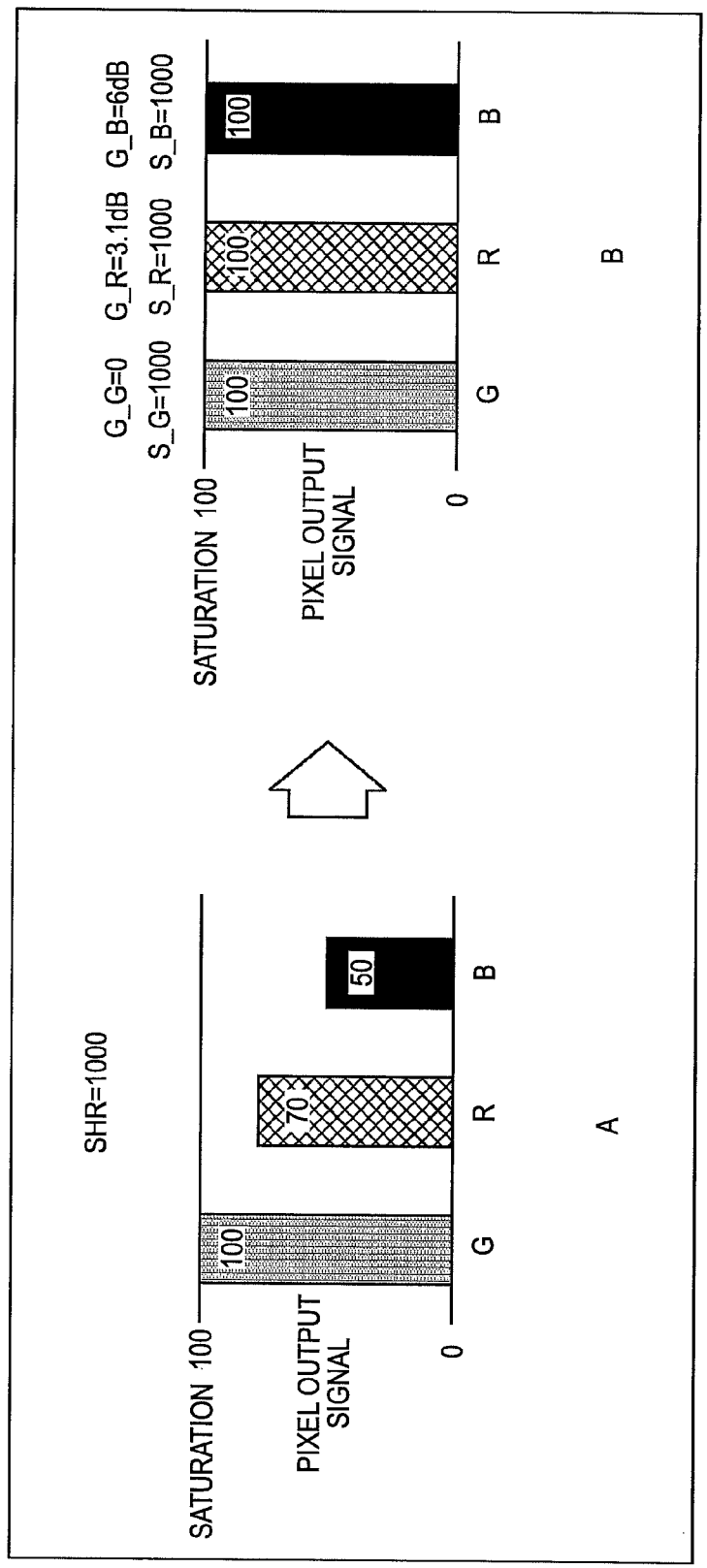
FIG. 7 is an explanatory drawing showing adjustment of the sensitivity ratio.

Referring now to FIG. 5 to FIG. 7, the adjustment of the sensitivity ratios will be described. FIG. 5 is an explanatory drawing showing a case of adjusting the sensitivity ratios by the storage periods by color. FIG. 6 is a drawing for explaining a case where the sensitivity ratios are adjusted by performing the adjustment of the gains by color simultaneously when the sensitivity ratios cannot be maintained to be constant only by the storage periods by color. FIG. 7 is a drawing for explaining a case where the sensitivity ratios are adjusted by performing the adjustment of the gains by color when the adjustment cannot be performed by the storage periods by color.

In FIG. 5 to FIG. 7, the following symbols have meanings shown below, respectively.

SHR: setting of the storage period in block
S_G: setting of the storage period in G pixels
S_R: setting of the storage period in R pixels
S_B: setting of the storage period in B pixels
G_G: setting of the gain in the G pixels
G_R: setting of the gain in the R pixels
G_B: setting of the gain in the B pixels In FIG. 5 to FIG. 7, the maximum set time of the storage period is set to 1000. Also, cases where imaging of scenes of high illumination/middle illumination/low illumination is performed in the one-frame processing time will be described as examples. Also, a case where the sensitivity by color decreases in an order of green, red and blue, and the sensitivity ratios are Green:Red:Blue=1.0:0.7:0.5 will be described as an example.

Referring now to FIG. 5, the case of adjusting the sensitivity ratios on the basis of the storage periods by color will be described. When the storage period is set for all the pixels in block as described in the related art, it is necessary to set the storage period so as to conform the saturation of the pixels having high sensitivity (the pixels with a green filter). As shown in A in FIG. 5, when SHR=100, that is, when imaging a scene with a high illuminance, signals are saturated in a substantially short storage period. When the pixels with a green filter having high sensitivity are saturated at a storage period 100 (S_G=100), if the storage is performed with the storage period 100 for the pixels with other colored filters as in the related art, the output signal levels of the pixels with a red filter only reach 70% of the saturating signal at the maximum. The output signal levels of the pixels with a blue filter only reaches 50% of the saturating signal level at the maximum.

In this manner, the pixels having low sensitivity such as the pixels with a red filter and the pixels with a blue filter cannot use up the saturating signals and hence become poor in tone reproducing property (cannot use up a dynamic range of A/D).

Accordingly, by adjusting the storage period by color as shown in B in FIG. 5, all of the colors are caused to reach the levels of the saturating signals. More specifically, the storage period for the pixels with a red filter is set to 143 (=100×100/70), and the storage period for the pixels with a blue filter is set to 200 (=100×100/50). In other words, the respective storage periods are set to S_G=SHR=100, S_R=143, and S_B=200.

The computation for setting the storage period is performed by dividing the storage period set to the pixels with a reference color filter (the pixels with a green filter in this case) (S_G, the same value as SHR) by the sensitivity ratios of the pixels with another color filter, in this case for example, a numerical value of 70, since the sensitivity ratio of the pixels with a red filter is 70, and multiplying by 100 to convert the value to a percentage.

By setting the storage period in this manner, all the pixels (the pixels of all colors) reach the saturating signal level, so that the sensitivity ratios can be maintained to be constant. In this case, since the storage periods do not exceed the maximum setting value for all the colors, individual setting of the gain is not necessary and the gain is set to G_G=G_R=G_B=0.

Increase in noise components can be inhibited by adjusting the sensitivity ratios by elongating the storage period in comparison with a case where the gain is applied to the output signals from the pixels with low sensitivity to amplify the signals as in the related art and hence the S/N ratio is improved. However, when imaging of a scene with an extremely high illuminance is performed, if an attempt is made to adjust the sensitivity ratios by the storage periods by color, there may arise a case where the error to be adjusted becomes too large, and hence there is a case where the adjustment is achieved better by using the gains by color. Such a circumstance is taken into account in the process shown in a flowchart in FIG. 8, described later.

Referring now to FIG. 6, a case where the sensitivity ratios are adjusted by combining the gain by color when the sensitivity ratios cannot be maintained to be constant only by the storing periods by color will be described. As shown in A in FIG. 6, when SHR=600 is satisfied, that is, when imaging a scene with a medium illuminance, the storage period until the pixels reach saturation is longer than that in the case of imaging the scene having a high illuminance.

In the case of setting the storage periods by color so as to maintain the sensitivity ratios constant when the pixels with a green filter are saturated in the storage period S_G=600, the storage period of the pixels with a red filter is set to 857 (=600×100/70), and the storage period of the pixels with a blue filter is set to 1200 (=600×100/50). However, since the storage period is limited to a maximum setting value (1000), the storage period of the pixels with a blue filter is set to 1000 even when being set to 1200 (even when the result of computation is 1200). Therefore, in this case, the sensitivity of only the pixels with a blue filter becomes lower.

In this case, in order to increase the sensitivity of the pixels with a blue filter (to be equal to the sensitivities of the pixels with filters of other colors), a setting is performed so that a gain of 1.6 dB (=1200/1000 times) is applied and the signals are amplified for the output signals from the pixels with a blue filter.

In this case, the respective storage periods are set to S_G=SHR=600, S_R=857, S_B=1000. Then, the gains are set to G_G=G_R=0 and G_B=1.6. With the storage periods and the gains set in this manner, the lack of the storage period can be compensated and the sensitivity ratios of the all the pixels can be made constant.

Referring now to FIG. 7, a case where the sensitivity ratios are adjusted by the gain by color when the sensitivity ratios cannot be adjusted by the storage period by color will be descried. As shown in A in FIG. 7, when SHR=1000 is satisfied, that is, when imaging a scene with a low illuminance, the storage period until the pixels are saturated is further longer than that in the case of imaging the scene having a medium illuminance.

When the pixels with a green filter are saturated in the storage period S_G=1000, in order to set the storage period by color so as to make the sensitivity ratios constant, since SHR=1000 is already satisfied, that is, since the value of the setting of the storage period in block already reaches 1000, which is the maximum setting value, the storage period can be set to S_G=S_R=S_B=1000, but cannot be set to the storage period with higher values. Therefore, the state is such that the adjustment of the sensitivity ratios cannot be performed only by setting the storage periods by color.

In such a case, control is performed to make the sensitivity ratios to be constant by adjusting the gains as well. In other words, in this case, control is performed to cause a gain of 3.1 dB (=100/70 times) to be applied to the output signals of the pixels with a red filter for the signal amplification. In the same manner, control is performed to cause a gain of 6 dB (=100/50) to be applied to the output signals of the pixels with a blue filter for the signal amplification. In this configuration, the sensitivity ratios are maintained to be constant.

In this case, the respective storage periods are set to SHR=S_G=S_R=A_B=1000. Then, the respective gains are set to G_G=0, G_R=3.1 and G_B=6. With the storage periods and the gains set in this manner, the lack of the storage period can be compensated and the sensitivity ratios of all the pixels can be made constant.

By determining in the CMOS image sensor 11, an optimal setting combined with the storage periods by color and the gains by color depending on the brightness of the scenes to be imaged, image data maintaining constant sensitivity ratios can be output from the sensor without being affected by the brightness of the scenes to be imaged. Consequently, adjustment of the color balance is facilitated, and the image quality is improved.

As a method of the signal amplification by the gain, either one of a method in which the gain is applied in the analogue signal processing such as switching the dynamic ranges of the A/D converter by color, or a method in which the gain is applied in the digital signal processing after the A/D conversion may be applied. Preferably, since the method of switching the dynamic ranges of the A/D converter by color achieves better tone reproducing properties, in other words, since the dynamic range of the A/D can be used up, application of the method of switching the dynamic ranges of the A/D converter by color seems to be preferable.

[Processing of Sensitivity Adjusting Circuit]

Subsequently, referring to a flowchart shown in FIG. 8, a process of making the sensitivity ratios constant as described above performed by the sensitivity adjusting circuit 19 (FIG. 1) will be described.

In Step S11, the storage period of the pixels with a green filter as a reference and the sensitivity ratios of the respective colors are set (acquired). The term "the sensitivity ratios of the respective colors" means the sensitivity ratios of the pixels with a green filter, the pixels with a red filter, and the pixels with a blue filter (hereinafter, referred to as G pixels, R pixels, and B pixels, respectively).

Here, although the description will be continued with the G pixels as a reference since the sensitivity ratio thereof is high, in a case of a CMOS image sensor 11 having properties such that the sensitivity ratio of a different pixel, for example, of the R pixels is higher than those of other pixels, the R pixels are set as a reference, and the storage period of the R pixels are acquired in the process in Step S11.

In other words, in Step S11, the storage period of pixels having high sensitivity ratio and the sensitivity ratios of all the colors are acquired. For example, in the circumstance shown in A in FIG. 5, the S_G=100, which is the storage period of the G pixels is set, and G pixels=100, the R pixels=70, and the B pixels=50 are set as the sensitivity ratios of the respective colors. The sensitivity ratios of the respective colors do not depend on the storage period or the like and are constant values, they are acquired (set) and do not have to be acquired every time in advance.

In Step S12, the acquired (set) storage period of the G pixels acquired in Step S12 and the predetermined threshold value are compared, and whether or not the storage period of the G pixels is not smaller than the threshold value is determined. If the storage period of the G pixels is determined to be larger than the predetermined threshold value in Step S12, the process goes to Step S13, and if the storage period of the G pixels is determined to be smaller than the predetermined threshold value, the process goes to Step S14.

The process in Step S14 will be described first. In Step S14, the sensitivity ratios are set to be adjusted by the gains, and the gains are set. In a case where the storage period of the G pixels are determined to be smaller than the predetermined threshold value, the adjustment error may become large by the adjustment by the storage periods by color, and hence the adjustment is performed by the gains by color. Additional description will be given about this circumstance.

For example, description will be given with a case of a system which is capable of setting the gains by an increment of 0.3 dB, and setting of the storage period by an increment of one line (CMOS image sensor 11), in which the storage period is 5 lines, and the sensitivity ratio is adjusted to 1.0625 times as an example.

When adjusting the sensitivity ratio by the storage period, an ideal storage period is;

$$5 \times 1.0625 = 5.3125$$

lines. However, since the storage period can only be adjusted by an increment of one line, the storage period needs to be set to 5 lines or 6 lines. Assuming that it is set to 6 lines, the 6 lines are excessive, and hence it is preferable to set the storage period to 5 lines.

Therefore, when the storage period is set to 5 lines, there arises a difference from the ideal storage period and the difference becomes the error. The error [dB] is obtained by (ideal storage period−actual storage period), and can be obtained as follows.

$$20 \times \log(1.0625) - 20 \times \log(1.0) = 0.5265 \text{ [dB]}$$

In other words, in this case, when the sensitivity ratio is adjusted to 1.0625 times by the storage period, an error is generated with respect to the ideal storage period by 0.5265 [dB].

In contrast, when the sensitivity ratio is adjusted by the gain under the same conditions, the sensitivity ratio is multiplied by 1.0625 by an increment of 0.3 dB, and hence the sensitivity ratio is set to a closest value. Therefore, the gain to be set is 0.3 dB. The error [dB] at this time is calculated as follows.

$$20 \times \log(1.0625) - 0.3 = 0.2265 \text{ [dB]}$$

In this case, when the sensitivity ratio is adjusted to 1.0625 times by the gain, an error is generated with respect to the ideal storage period by 0.2265 [dB].

Although the adjustment error by the gain is constant with respect to the predetermined sensitivity ratio irrespective of the illuminance, in the case of the adjustment in the storage period, the value of the storage period before the adjustment varies with the illuminance, and hence the adjustment error varies.

In this case, when the sensitivity ratio is adjusted by the storage period, the error of 0.5265 [dB] is generated, and when the sensitivity ratio is adjusted by the gain, an error of 0.2265 [dB] is generated. Therefore, it is understood that the adjustment of the sensitivity ratio with the gain, which causes smaller errors, is better. In this manner, in an area where the storage period is short (the area of a high illuminance), the adjustment by the storage period may cause a larger adjustment error than the adjustment by the gain. Therefore, the case where "the storage period of the G pixels is smaller than the predetermined threshold value" in Step S12, corresponds to a case where the error is smaller when being adjusted by the gain than the case of being adjusted by the storage period.

In Step S12, the predetermined threshold value compared with the storage period of the G pixels is a threshold value for determining that the error is smaller by being adjusted by the gain than being adjusted by the storage period as described above.

Figure 8:
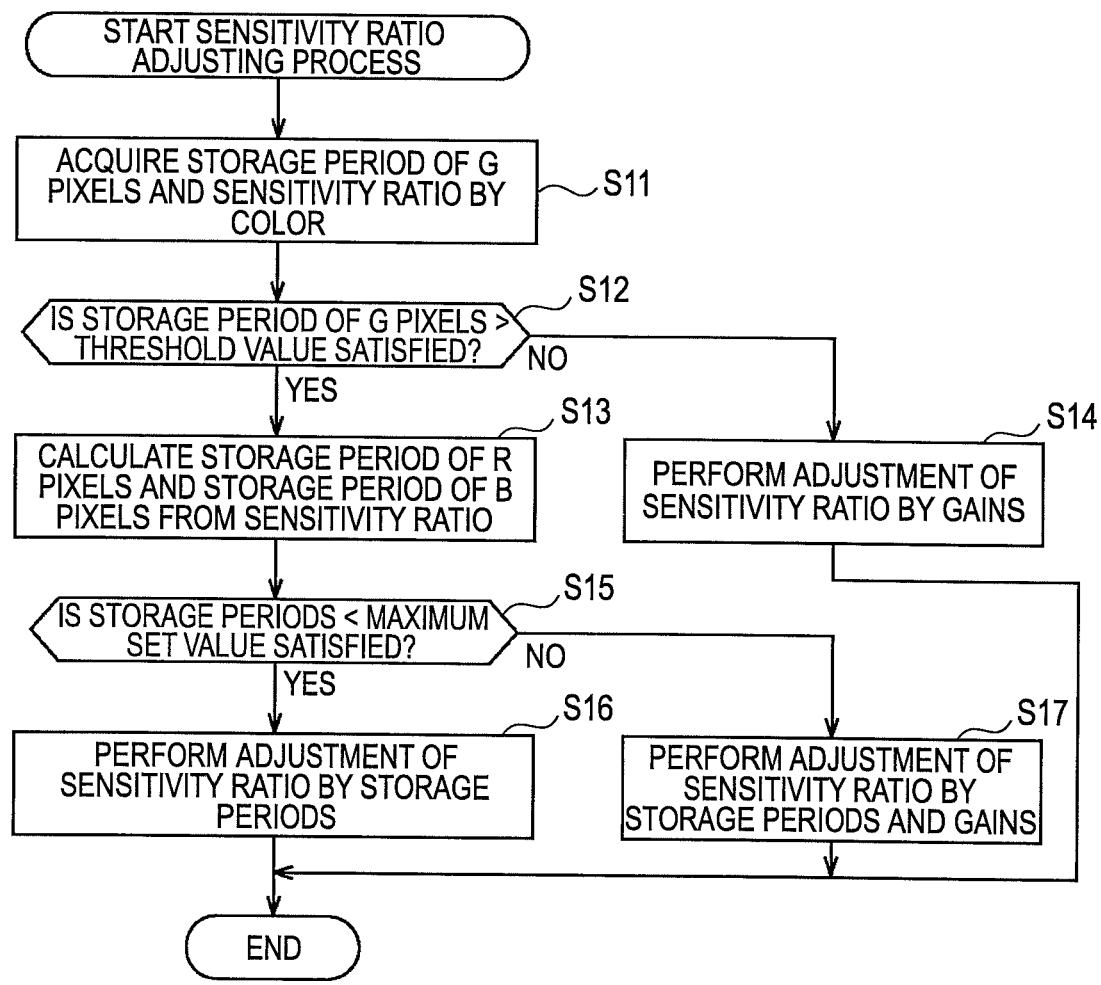
FIG. 8 is a flowchart for explaining a process relating to the adjustment of the sensitivity ratio.

Returning the description back to the flowchart shown in FIG. 8, in Step S12, if it is determined that the storage period of the G pixels is smaller than the predetermined threshold value, and the process goes to Step S14, the sensitivity adjusting circuit 19 sets gains to be applied to the signals supplied in sequence form the horizontal scanning line 17 in the output processing circuit 18.

The gain to be set is set as described above with reference to FIG. 6, for example. In other words, it can be obtained by calculating the target storage period, obtaining how many fold of the maximum setting value the storage period (1000 in FIG. 6) is, and calculating the gain from the obtained value.

In contrast, if the storage period of the G pixels is determined not to be smaller than the predetermined threshold value in Step S12, the process goes to Step S13. In Step 13, the storage period of the R pixels and the storage period of the B pixels are calculated from the sensitivity ratios. As regards how the storage period is calculated from the sensitivity ratio, for example, as described with reference to FIG. 5, it can be obtained by dividing the storage period of the G pixels at that time point by the sensitivity ratio, and multiplying the result by 100.

For example, as described with reference to B in FIG. 5, when the storage period of the G pixels is S_G=100, and the sensitivity ratio of the R pixels is 70% (0.7) of the G pixels, the storage period of the R pixels S_R is calculated as 100×100/70=143. The storage period of the B pixels is calculated in the same manner.

When the storage periods of the R pixels and the B pixels are calculated respectively in Step S13, whether or not the storage periods do not exceed the maximum setting value is determined in Step S15. This determination may be set to be performed respectively for the R pixels and the B pixels. However, when the sensitivity ratio of the R pixels is higher than the sensitivity ratio of the B pixels, the storage period of the B pixels is longer. Therefore, the determination may be set to be made depending on whether or not the storage period of the B pixels does not exceed the maximum setting value. Such a determination can be achieved as long as the storage period of the B pixels is calculated. Therefore, when the storage period is calculated in Step S13, it may be configured to calculate only the storage period of the B pixels.

In other words, it may be configured to calculate the storage period of the pixels having the lowest sensitivity ratio and determine whether or not the storage period does not exceed the maximum setting value, or it may be configured to calculate the storage periods of all the colors and, determine whether or not the storage period having a largest value does not exceed the maximum setting value.

When the storage period is determined not to exceed than maximum setting value in Step S15, the process goes to Step S16. In Step S16, the adjustment of the sensitivity ratio by the storage period will be performed. The process goes from Step S15 to Step S16 only under the circumstances described with reference to FIG. 5. In other words, it is a state in which the storage period does not exceed the maximum setting value, and hence the sensitivity ratios of all the colors can be made constant only by the adjustment of the storage period.

In contrast, if it is determined that the storage period is not smaller than the maximum setting value, the process goes to Step S17. In Step S17, the adjustment of the sensitivity ratio by the storage period and the gain is performed. The process goes from Step S15 to Step S17 only under the circumstances described with reference to FIG. 6 or FIG. 7. In other words, it is a state in which the pixels having the storage period not smaller than the maximum setting value are included, and hence the sensitivity ratios can be made constant in all the colors by adjusting not only the storage periods, but also the gains for such included pixels.

In this manner, the adjustment of the storage periods and the adjustment of the gains are performed so as to make the sensitivity ratios for all the colors are constant.

For reference sake, if the storage period of the G pixels is determined to be the same value as the predetermined threshold value in Step S12, the process may go to Step S13, or the process may go to Step S14.

Also, if the storage period and the maximum setting value are determined to be the same value in Step S15, the process may go to Step S16, or the process may go to Step S17. Even when the process goes to Step S16 to cause the adjustment of the sensitivity ratio to be performed only by the adjustment of the storage period, the process can be performed as long as the storage period and the maximum setting value are the same value. Therefore, when considering that the gain is also applied to the noise by adjusting the gain, it seems to be preferable to cause the process to go to Step S16.

Since the optimal setting is achieved from the reference storage period set in this manner and the sensitivity ratios of the respective colors, output of the image data in which the constant sensitivity ratios are always maintained irrespective of the brightness of the scene to be imaged from the CMOS image sensor 11 is enabled.

Also, since the sensitivity ratio of the respective colors can be maintained to be constant, the adjustment of the color balance can be performed easily. In addition since the saturating signals of the respective pixels having different sensitivities can be used up, the S/N ratio can be improved.

[Recording Medium]

A series of the processes as described above may be executed by hardware or may be executed by software. When executing the series of processes by the software, the program which constitutes the software is installed in a computer. Here, the computer includes a computer integrated in specific hardware, or for example, a general-purpose personal computer which is capable of executing various functions by being installed with various programs.

Figure 9:
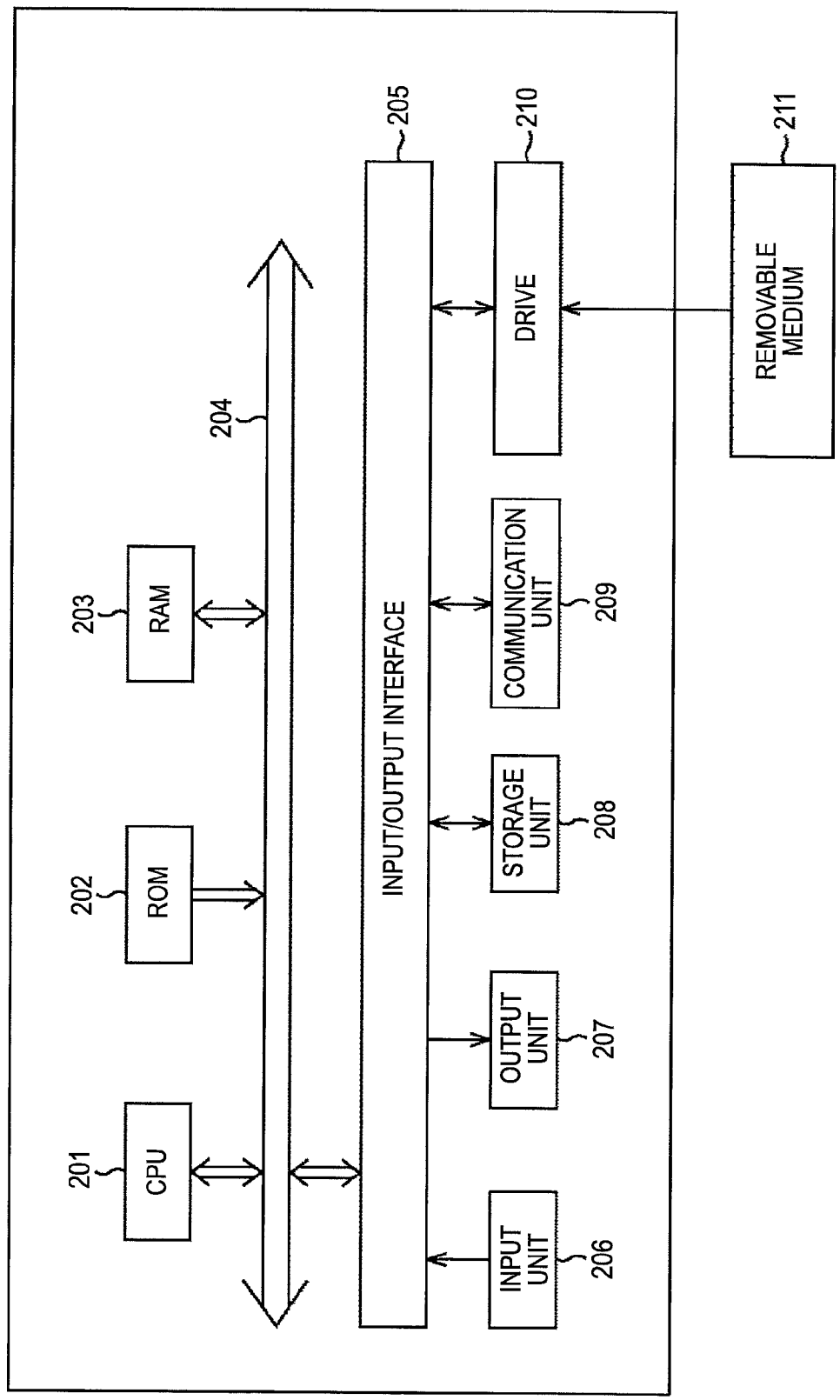
FIG. 9 is an explanatory drawing showing recording medium.

FIG. 9 is a block diagram showing a configuration of the hardware of the computer which executes the series of processes described above by a program. In the computer, a CPU (Central Processing Unit) 201, a ROM (Read Only Memory) 202, and a RAM (Random Access Memory) 203 are connected each other by a bus 204. The I/O interface 205 is further connected to the bus 204. An input unit 206, an output unit 207, a storage unit 208, a communication unit 209, and a drive 210 are connected to the I/O interface 205.

The input unit 206 includes a keyboard, a mouse, and a microphone. The output unit 207 includes a display, and a speaker. The storage unit 208 includes a hard disk or a volatile memory. The communication unit 209 includes a network interface. The drive 210 drives removable media 211 such as a magnet disk, an optical disk, a magneto-optical disk, or a semiconductor memory.

In the computer configured as described above, the above-described series of processes are performed by the CPU 201 by loading and executing the program stored in the storage unit 208 for example, via the I/O interface 205 and the bus 204.

The program executed by the computer (CPU 201) can be provided by recording in the removable medium 211 as a package medium. The program may be provided via a wired or wireless transmission medium such as local area network, internet or digital satellite broadcasting.

In the computer, the program can be installed in the storage unit 208 via the I/O interface 205 by mounting the removable medium 211 in the drive 210. Also, the program can be received by the communication unit 209 via the wired or wireless transmission medium and installed in the storage unit 208. Other programs may be installed in the ROM 202 or the storage unit 208 in advance.

The program executed by the computer may be a program which executes processes in time series along the order described in this specification, or may be a program which executes the processes in parallel or at required timings such as when there is an access or the like.

In this specification, the term "system" represents the entire apparatus including a plurality of apparatuses.

The embodiments of the invention is not limited to the embodiments shown above, and various modifications may be made without departing the scope of the invention.

REFERENCE NUMERALS

11 CMOS image sensor, 12 timing control circuit, 13 row scanning circuit, 14 pixel array portion, 16 column scanning circuit, 17 horizontal output line, 18 output processing circuit, 19 sensitivity adjusting circuit, 21 pixel

The invention claimed is:

1. An imaging device comprising:
pixels including a photoelectric conversion element, arrayed two-dimensionally in a matrix pattern and arrayed in a state of being classified in groups by color on the basis of the color filter array;
storage period controlling means configured to control storage periods for storing charges in the pixels by color;
gain control means configured to control gains when amplifying signals corresponding to charges stored in the pixels and read out from the pixels;
adjusting means configured to adjust the sensitivity ratio of the pixels different from color to color by setting the storage periods by color in the storage period control means, and setting the gains by color in the gain control means, wherein
the adjusting means includes:
acquiring means configured to acquire a storage period set to the pixels having a best sensitivity ratio and the sensitivity ratios by colors;
calculating means configured to calculate the storage periods of the pixels by color from the storage period and the sensitivity ratios acquired by the acquiring means;
first setting means configured, when all the storage periods calculated by the calculating means do not exceed the maximum setting value, to set the calculated storage periods to the storage period control means; and
second setting means configured, when there is a color whose storage period exceeds the maximum setting value of the storage period from among the storage periods calculated by the calculating means, to set the storage period at the maximum setting value to the storage period control means for the signal of the corresponding color, and calculate a gain by which the signal of the corresponding color is multiplied and set the gain to the gain control means in order to compensate for the lack of the storage period.

2. The imaging device according to claim 1, wherein the adjusting means further includes:
determining means configured to determine whether or not the storage period acquired by the acquiring means does not exceed a predetermined threshold value; and
third setting means configured, when the storage period of the pixels is determined not to exceed the predetermined threshold value, to calculate a gain by which the respective signals are multiplied on the basis of the sensitivity ratio acquired by the acquiring means by color and set the gain to the gain control means.

3. The imaging device according to claim 2 wherein the predetermined threshold value is a value for determining that the error in the adjustment of the sensitivity ratio is smaller when adjusting the sensitivity ratio of the pixels by color by adjusting the gain than when adjusting the same by the storage period.

4. A drive control method for an imaging device comprising:
pixels including a photoelectric conversion element, arrayed two-dimensionally in a matrix pattern and arrayed in a state of being classified in groups by color on the basis of the color filter array;
storage period controlling means configured to control storage periods for storing charges in the pixels by color;
gain control means configured to control gains when amplifying signals corresponding to charges stored in the pixels and read out from the pixels;
adjusting means configured to adjust the sensitivity ratio of the pixels different from color to color by setting the storage periods by color in the storage period control means, and setting the gains by color in the gain control means, wherein
the method including steps of
acquiring a storage period set to the pixels having a best sensitivity ratio and the sensitivity ratios by colors;
calculating the storage periods of the pixels by color from the acquired storage period and the sensitivity ratios;
when calculated all the storage periods do not exceed the maximum setting value, setting the calculated storage periods to the storage period controlling means; and
when there is a color whose storage period exceeds the maximum setting value of the storage period from among the calculated storage periods, setting the storage period at the maximum setting value to the storage period control means for the signal of the corresponding color, and calculating a gain by which the signal of the corresponding color is multiplied and set the gain to the gain control means in order to compensate for the lack of the storage period.

5. A non-transitory computer readable medium stored therein a program to be executed to cause a computer configured to control adjusting means of an imaging device comprising:
pixels including a photoelectric conversion element, arrayed two-dimensionally in a matrix pattern and arrayed in a state of being classified in groups by color on the basis of the color filter array;
storage period controlling means configured to control storage periods for storing charges in the pixels by color;
gain control means configured to control gains when amplifying signals corresponding to charges stored in the pixels and read out from the pixels; and
adjusting means configured to adjust the sensitivity ratio of the pixels different from color to color by setting the storage periods by color in the storage period control means, and setting the gains by color in the gain control means, the computer executes a process including:
acquiring a storage period set to the pixels having a best sensitivity ratio and the sensitivity ratios by colors;
calculating the storage periods of the pixels by color from the acquired storage period and the sensitivity ratios;
when calculated all the storage periods do not exceed the maximum setting value, setting the calculated storage periods to the storage period setting means; and
when there is a color whose storage period exceeds the maximum setting value of the storage period from among the calculated storage periods, setting the storage period at the maximum setting value to the storage period control means for the signal of the corresponding color, calculating a gain by which the signal of the corresponding color is multiplied and setting the gain to the gain control means in order to compensate for the lack of the storage period.

* * * * *